United States Patent
Wunderlich

(10) Patent No.: US 9,442,272 B2
(45) Date of Patent: Sep. 13, 2016

(54) F-THETA OBJECTIVE

(71) Applicant: JENOPTIK Optical Systems GmbH, Jena (DE)

(72) Inventor: Joerg Wunderlich, Brahmenau (DE)

(73) Assignee: JENOPTIK Optical Systems GmbH, Jena (DE)

( * ) Notice: Subject to any disclaimer, the term of this patent is extended or adjusted under 35 U.S.C. 154(b) by 141 days.

(21) Appl. No.: 14/332,971

(22) Filed: Jul. 16, 2014

(65) Prior Publication Data

US 2015/0022899 A1    Jan. 22, 2015

(30) Foreign Application Priority Data

Jul. 16, 2013   (DE) .................... 20 2013 006369 U
Oct. 17, 2013   (DE) .................... 20 2013 009184 U
Mar. 14, 2014   (DE) .................... 20 2014 002322 U

(51) Int. Cl.
*G02B 9/60*   (2006.01)
*G02B 13/00*  (2006.01)
*G02B 13/14*  (2006.01)
*G02B 13/22*  (2006.01)

(52) U.S. Cl.
CPC ............ *G02B 13/0005* (2013.01); *G02B 9/60* (2013.01); *G02B 13/143* (2013.01); *G02B 13/22* (2013.01)

(58) Field of Classification Search
CPC .. G02B 9/60; G02B 13/0005; G02B 13/143; G02B 13/22

USPC ........... 359/659, 662, 206.1, 770, 643, 753, 359/350

See application file for complete search history.

(56) References Cited

U.S. PATENT DOCUMENTS

| | | | | |
|---|---|---|---|---|
| 3,118,963 | A * | 1/1964 | Ruben ................ | G02B 21/02 359/659 |
| 4,130,350 | A * | 12/1978 | Koizumi ............. | G02B 21/02 359/659 |
| 4,917,483 | A * | 4/1990 | Nakao ................ | G02B 13/0005 359/662 |
| 5,111,325 | A * | 5/1992 | DeJager ............. | G02B 13/0005 359/206.1 |
| 7,924,510 | B2 * | 4/2011 | Kobayashi ......... | G02B 13/04 359/715 |
| 8,879,171 | B2 * | 11/2014 | Wunderlich ....... | G02B 13/0005 359/662 |

* cited by examiner

*Primary Examiner* — Zachary Wilkes
(74) *Attorney, Agent, or Firm* — Muncy, Geissler, Olds & Lowe, P.C.

(57) ABSTRACT

An F-theta objective is provided that has five individual lenses with a first individual lens as biconcave lens with a focal length, a second individual lens as meniscus with a focal length, a third individual lens as meniscus with a focal length, a fourth individual lens as a biconvex lens with a focal length and a fifth individual lens as a plano-convex lens with a focal length and a total focal length f of the F-theta objective. A ratio between the focal lengths to the total focal length satisfies predetermined conditions.

4 Claims, 1 Drawing Sheet

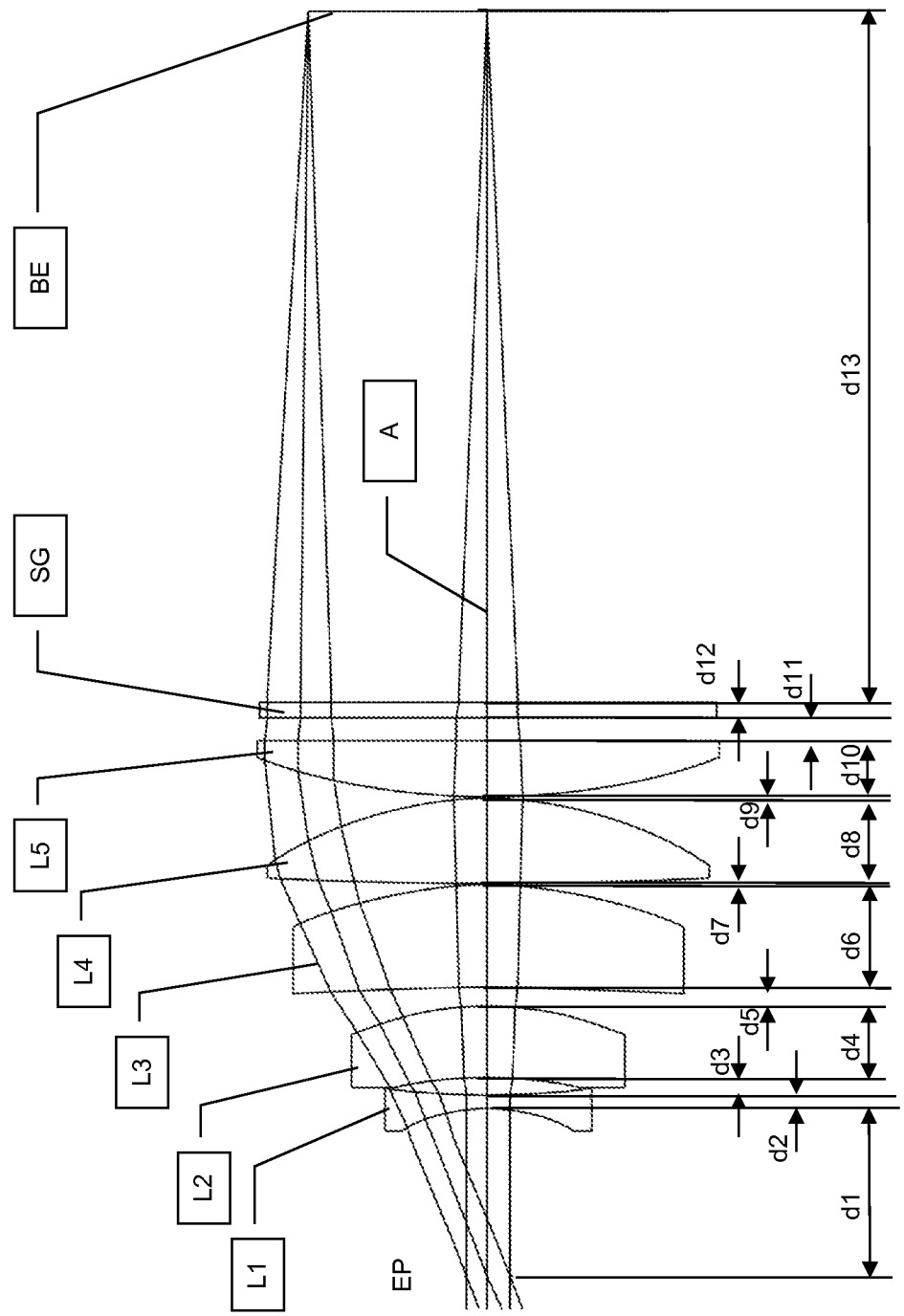

F-THETA OBJECTIVE

This nonprovisional application claims priority under 35 U.S.C. §119(a) to German Patent Application Nos. DE 20 2013 006 369.6, which was filed in Germany on Jul. 16, 2013; DE 20 2013 009 184.3, which was filed in Germany on Oct. 17, 2013, and to DE 20 2014 002 322.0, which was filed in Germany on Mar. 14, 2014, all of which are herein incorporated by reference.

BACKGROUND OF THE INVENTION

1. Field of the Invention

The invention relates to an F-theta objective as can be used in a scan apparatus for laser material processing.

2. Description of the Background Art

An F-theta objective focuses a laser beam, which is incident in a manner such that it scans over a scan-angle region $+/-\theta$ with respect to the optical axis of the F-theta objective, into a flat image field, wherein, within this scan-angle region, the ratio of scan angle and distance of the point of incidence of the laser beam from the optical axis in the image field follows a linear function. That is to say that a laser beam scanning at a constant angular velocity generates a focal point in the image field, which focal point moves at a constant speed. Here, the size of the focal point should be constant at each location in the image field.

The size of the focal point is determined in dependence on the purpose of the laser material processing, e.g. writing, coating removal or cutting.

Owing to the wavelength-dependent refraction of the laser beam as it passes through the F-theta objective, F-theta objectives are corrected, in order to achieve a high focal point quality, to the wavelength of the processing laser beam used, that is to say the objective is calculated such that it has, for an image field of prespecified size within a permissible temperature tolerance for a prespecified wavelength and a prespecified laser beam diameter, no or only very slight optical aberrations which result in a distinct change in the size of the focal point. In particular for use in laser material processing, F-theta objectives have a large image field and a large total focal length.

SUMMARY OF THE INVENTION

It is therefore an object of the invention to provide an F-theta objective for high-power lasers with a wavelength of 355 nm and a total focal length of between 90 mm and 110 mm, in particular 100 mm-105 mm, which enables imaging of the laser radiation without retroreflection and should be of a telecentric configuration. It is thus possible, for example, for holes to be inserted perpendicularly into a workpiece and/or to achieve identical diameters in the X- and Y-scanning directions [otherwise ellipse in X or Y]. At the same time, a uniform burr formation is intended to be achieved thereby during material processing. The aim is therefore to obtain a higher energy density with a circular focus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, wherein the sole FIGURE illustrates a geometric optics diagram of an objective according to an embodiment of the invention.

DETAILED DESCRIPTION

An F-theta objective according to an embodiment of the invention has, arranged at a distance upstream of the F-theta objective, an entrance pupil EP which can be arranged in a plane in which a scanner mirror, or if two scanner mirrors are used a substitute plane that is calculated for this, is located, and comprises five individual lenses $L_1$-$L_5$ which are arranged on a common optical axis A. The five individual lenses $L_1$-$L_5$ are configured such that they form a "negative-positive-positive-positive-positive" lens sequence. That is to say that the first individual lens $L_1$ has a negative focal length, whereas the second to fifth lenses $L_2$-$L_5$ have a positive focal length.

The first lens $L_1$ here is a biconcave lens, the second lens $L_2$ is a meniscus, the third lens $L_3$ is also a meniscus, the fourth lens $L_4$ is a biconvex lens, and the fifth lens $L_5$ is a plano-convex lens.

The focal lengths of the five individual lenses should satisfy the following requirement:

The focal length ratio of the focal length $f_1$ of the first lens $L_1$ to the total focal length is f: $-1.0 < f_1/f < -0.4$.

The focal length ratio of the focal length $f_2$ of the second lens $L_2$ to the total focal length is f: $+3.6 < f_2/f < +4.2$.

The focal length ratio of the focal length $f_3$ of the third lens $L_3$ to the total focal length is f: $+2.0 < f_3/f < +2.8$.

The focal length ratio of the focal length $f_4$ of the fourth lens $L_4$ to the total focal length is f: $+1.4 < f_4/f < +1.8$.

The focal length ratios of the focal length $f_5$ of the fifth lens $L_5$ to the total focal length is f: $+2.7 < f_5/f < +3.1$.

A protective glass SG can be arranged downstream of the five individual lenses $L_1$-$L_5$.

The useful effect achieved by an F-theta objective according to the invention is that with five individual lenses $L_1$-$L_5$ of quartz glass, an F-theta objective with a total focal length of between 90 mm and 110 mm, which is suitable for a high-power laser and is corrected for a wavelength of 355 nm, results. The F-theta objective is configured with its parameters such that retroreflections, which are produced on the optically active faces of the lenses $L_1$-$L_5$ and, if appropriate, the protective glass SG, are not focused onto the optical surfaces of the lenses $L_1$-$L_5$ or onto the mirrors arranged around the entrance pupil EP. The configuration is adapted such that no retroreflections occur in the material of the lenses and no retroreflections occur at the sites of the scanner positions.

The specific structure and the parameters of an exemplary embodiment for such an F-theta objective are described below.

The entrance pupil EP of the F-theta objective is located at a distance $d_1$ in front of the front vertex point of the first lens $L_1$, a biconcave lens with a thickness $d_2$, the front surface of which has a radius $r_1$ and the back surface of which has a radius $r_2$. This first lens $L_1$ is followed, with an air gap $d_3$, by the second lens $L_2$, a positive meniscus having a thickness $d_4$, the front surface of which has a radius $r_3$ and the back surface of which has a radius $r_4$.

This is followed, with an air gap $d_5$, as third lens $L_3$, likewise by a positive meniscus having a thickness $d_6$, the front surface of which has a radius $r_5$ and the back surface of which has a radius $r_6$. This is followed, with an air gap $d_7$, by the fourth lens $L_4$, a biconvex lens having a thickness $d_8$, the front surface of which has a radius $r_7$ and the back surface of which has a radius $r_8$. This is followed, with an air gap $d_9$, by a plano-convex lens having a thickness of $d_{10}$, the front surface of which has a radius $r_9$ and the back surface of which has a radius $r_{10}$. In the exemplary embodiment, this is followed, with an air gap $d_{11}$, by a plane-parallel protective glass SG having a thickness of $d_{12}$. The image field BE is produced at a distance of $d_{13}$ from the protective glass SG. Quartz glass with a refractive index $n_e$ was selected as the material for all of the individual lenses $L_1$-$L_5$ and the protective glass SG.

The radii of the individual lenses $L_1$-$L_5$, and the thicknesses and distances d thereof are given in the following table 1.

| Medium |  | Radius (mm) |  | Thickness (mm) | $n_e$ |
|---|---|---|---|---|---|
| air |  | EP | $d_1$ | 35.0 |  |
| $L_1$ | $r_1$ | 38.8 | $d_2$ | 3.0 | 1.46 |
| $L_1$ | $r_2$ | 243.6 |  |  |  |
| air |  |  | $d_3$ | 5.5 | 1 |
| $L_2$ | $r_3$ | 118.8 | $d_4$ | 15.0 | 1.46 |
| $L_2$ | $r_4$ | 76.5 |  |  |  |
| air |  |  | $d_5$ | 2.2 | 1 |
| $L_3$ | $r_5$ | 285.8 | $d_6$ | 20 | 1.46 |
| $L_3$ | $r_6$ | 86.0 |  |  |  |
| air |  |  | $d_7$ | 0.2 |  |
| $L_4$ | $r_7$ | 1695.9 | $d_8$ | 25 | 1.46 |
| $L_4$ | $r_8$ | 90.2 |  |  |  |
| air |  |  | $d_9$ | 0.2 |  |
| $L_5$ | $r_9$ | 138.0 | $d_{10}$ | 15 | 1.46 |
| $L_5$ | $r_{10}$ | ☐ |  |  |  |
| air |  |  | $d_{11}$ | 5 |  |
| SG | $r_{11}$ | ☐ |  |  |  |
| SG | $r_{12}$ | ☐ |  |  |  |

The distances and thicknesses are all designated d and are numbered according to their sequence along the optical axis A of the F-theta objective in the beam passage direction and indicated as $d_1$-$d_{13}$ in FIG. 1.

The terms "front" and "back" surface can refer to the beam passage direction. The radii $r_1$-$r_{12}$ can be associated clearly with reference to the relevant lenses $L_1$-$L_5$ and the protective glass SG and are therefore not indicated in FIG. 1 for the sake of clarity.

In dependence on the material-dependent refractive indices $n_e$ of the individual lenses $L_1$-$L_5$, the thicknesses $d_2$, $d_4$, $d_6$, $d_8$, $d_{10}$ of the individual lenses $L_1$-$L_5$ determine, in connection with the radii of curvature $r_1$-$r_{10}$ of the individual lenses, in each case the focal lengths $f_1$-$f_5$ of the individual lenses $L_1$-$L_5$. The focal lengths $f_1$-$f_5$, which in each case describe the distance of a focal point from a main plane of an individual lens $L_1$-$L_5$, are not shown in FIG. 1, because the main planes of the individual lenses $L_1$-$L_5$ are not indicated for the sake of clarity. The total focal length f, which describes the distance of the image field BE from a substitute main plane for the F-theta objective, is likewise not indicated.

For an F-theta objective with the parameters indicated here, the result is a focal length $f_1$ with respect to the total focal length f of −0.7 for the first lens $L_1$, a focal length $f_2$ with respect to the total focal length f of +3.9 for the second lens $L_2$, a focal length $f_3$ with respect to the total focal length f of +2.4 for the third lens $L_3$, a focal length $f_4$ with respect to the total focal length f of +1.6 for the fourth lens $L_4$ and a focal length $f_5$ with respect to the total focal length f of +2.9 for the fifth lens $L_5$.

The result of the arrangement of the lenses $L_1$-$L_5$ successively in conjunction with their air gaps $d_3$, $d_5$, $d_7$, $d_9$ is the total focal length f of 103 mm. The F-theta objective is corrected for a wavelength of 355 nm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An F-theta objective, comprising five individual lenses sequentially arranged, comprising:
   a first individual lens $L_1$ as a biconcave lens with a focal length $f_1$,
   a second individual lens $L_2$ as a meniscus with a focal length $f_2$;
   a third individual lens $L_3$ as a meniscus $L_3$ with a focal length $f_3$;
   a fourth individual lens $L_4$ as a biconvex lens with a focal length $f_4$; and
   a fifth individual lens $L_5$ as a plano-convex lens with a focal length $f_5$,
   wherein the F-theta objective has a total focal length f, and
   wherein the ratio between the focal lengths $f_1$-$f_5$ to the total focal length f satisfies the following conditions:

$-1.0 < f_1/f < -0.4$ $+3.6 < f_2/f < +4.2$ $+2.0 < f_3/f < +2.8$ $+1.4 < f_4/f < +1.8$ $+2.7 < f_5/f < +3.1.$

2. The F-theta objective as claimed in claim 1, wherein $f_1/f=-0.7$, $f_2/f=+3.9$, $f_3/f=+2.4$, $f_4/f=+1.6$, $f_5/f=+2.9$.

3. The F-theta objective as claimed in claim 2, wherein an entrance pupil EP of the F-theta objective is located in front of the first individual lens $L_1$ at a distance $d_1$ of 35.0 mm.

4. The F-theta objective as claimed in claim 1, wherein a scanned beam is aligned telecentrically with respect to an optical axis.

* * * * *